(12) United States Patent
Corona

(10) Patent No.: US 9,781,772 B2
(45) Date of Patent: Oct. 3, 2017

(54) ANALOG THERMOSTATIC CONTROL CIRCUIT FOR A HEATING PAD

(71) Applicant: DSM&T Company, Inc., Fontana, CA (US)

(72) Inventor: Sergio Corona, Upland, CA (US)

(73) Assignee: DSM&T Company, Inc., Fontana, CA (US)

(*) Notice: Subject to any disclaimer, the term of this patent is extended or adjusted under 35 U.S.C. 154(b) by 0 days.

(21) Appl. No.: 15/061,779

(22) Filed: Mar. 4, 2016

(65) Prior Publication Data

US 2016/0192442 A1 Jun. 30, 2016

Related U.S. Application Data

(62) Division of application No. 14/326,591, filed on Jul. 9, 2014, now Pat. No. 9,370,045.

(60) Provisional application No. 61/938,336, filed on Feb. 11, 2014.

(51) Int. Cl.
*H05B 1/02* (2006.01)
*H05B 3/36* (2006.01)
*B32B 38/18* (2006.01)

(52) U.S. Cl.
CPC ....... *H05B 1/0213* (2013.01); *B32B 38/1858* (2013.01); *H05B 1/0205* (2013.01); *H05B 1/0294* (2013.01); *H05B 3/36* (2013.01); *B32B 2250/40* (2013.01); *B32B 2305/345* (2013.01); *B32B 2327/06* (2013.01); *B32B 2367/00* (2013.01)

(58) Field of Classification Search
CPC ...... H05B 1/0213; H05B 1/0294; H05B 1/36; H05B 1/0205; H05B 1/0272; H05B 3/34; H05B 1/02; H05B 2203/035; B32B 38/1858; B32B 2250/40; B32B 2305/345; B32B 2367/00; B23B 2327/06
USPC ........ 219/209, 210, 497, 212, 213, 505, 494
See application file for complete search history.

(56) References Cited

U.S. PATENT DOCUMENTS

| | | | |
|---|---|---|---|
| 1,760,301 A | 5/1930 | Dougherty |
| 1,820,602 A | 8/1931 | Dick |
| 1,839,580 A | 1/1932 | Myron |
| 1,851,499 A | 3/1932 | Edwards |
| 2,024,153 A | 12/1935 | Eskin |
| 2,153,078 A | 4/1939 | Deuches |
| 2,162,021 A | 6/1939 | Kidwell |
| 2,185,692 A | 1/1940 | McCleary |

(Continued)

FOREIGN PATENT DOCUMENTS

GB 2168580 6/1986

*Primary Examiner* — Mark Paschall
(74) *Attorney, Agent, or Firm* — Keusey & Associates, P.C.

(57) ABSTRACT

A heat mat with thermostatic control having a reference voltage generating source that provide high voltage DC for a power controller and low voltage for a temperature sensor and hysteresis circuit. The sensor and hysteresis circuit establish a temperature threshold signal that is delivered to the resistance heating element. The resistance heating element is sandwiched between two layers of material with adhesive. Two layers of PVC protects the sandwich. In manufacturing the heat mat, the resistance heating element is placed with adhesive between two layers of material then cured and degassed under vacuum. The thermostatic control is sealed within an overmold housing or flat pack.

7 Claims, 5 Drawing Sheets

(56) References Cited

U.S. PATENT DOCUMENTS

| | | | |
|---|---|---|---|
| 2,376,902 | A | 5/1945 | Clark |
| 2,400,735 | A | 5/1946 | Bradford |
| 2,401,605 | A | 6/1946 | Boren |
| 2,425,686 | A | 8/1947 | Porter |
| 2,477,387 | A | 7/1949 | Mestitz |
| 2,621,279 | A | 12/1952 | Richardson |
| 2,649,533 | A | 8/1953 | Meredith, Jr. et al. |
| 2,666,839 | A | 1/1954 | Boetel |
| 2,714,416 | A | 8/1955 | Fener |
| 2,844,696 | A | 7/1958 | Custer, Jr. |
| 2,850,617 | A | 9/1958 | Coldren |
| 2,873,352 | A | 2/1959 | Franco |
| 2,918,558 | A | 12/1959 | Evans |
| 2,948,802 | A | 8/1960 | Shaw |
| 3,041,441 | A | 6/1962 | Elbert et al. |
| 3,114,825 | A | 12/1963 | Kilburn et al. |
| 3,495,328 | A | 2/1970 | Ziver |
| 3,678,844 | A * | 7/1972 | Marshall .............. A47J 37/0676 99/340 |
| 3,721,800 | A | 3/1973 | Eisler |
| RE28,656 | E | 12/1975 | Crowley et al. |
| 4,237,441 | A | 12/1980 | van Konynenburg et al. |
| 4,242,573 | A | 12/1980 | Batliwalla |
| 4,271,350 | A | 6/1981 | Crowley |
| 4,277,673 | A | 7/1981 | Kelly |
| 4,309,596 | A | 1/1982 | Crowley |
| 4,327,480 | A | 5/1982 | Kelly |
| 4,348,584 | A | 9/1982 | Gale et al. |
| 4,367,168 | A | 1/1983 | Kelly |
| 4,396,011 | A | 8/1983 | Mack et al. |
| 4,400,614 | A | 8/1983 | Sopory |
| 4,423,308 | A | 12/1983 | Callaway et al. |
| 4,425,497 | A | 1/1984 | Leary et al. |
| 4,436,986 | A | 3/1984 | Carlson |
| 4,439,666 | A | 3/1984 | Graham |
| 4,444,708 | A | 4/1984 | Gale et al. |
| 4,503,416 | A | 3/1985 | Kim |
| 4,520,260 | A | 5/1985 | Kotian et al. |
| 4,527,566 | A | 7/1985 | Abare |
| 4,541,898 | A | 9/1985 | Mase et al. |
| 4,550,358 | A | 10/1985 | Crowley et al. |
| 4,582,983 | A | 4/1986 | Midgley et al. |
| 4,645,498 | A | 2/1987 | Kosak |
| 4,656,334 | A | 4/1987 | Endo et al. |
| 4,661,689 | A | 4/1987 | Harrison |
| 4,676,247 | A | 6/1987 | Van Cleve |
| 4,713,531 | A | 12/1987 | Fennekels et al. |
| 4,717,812 | A | 1/1988 | Makita |
| 4,719,335 | A | 1/1988 | Batliwalla et al. |
| 4,736,088 | A | 4/1988 | Bart |
| 4,761,541 | A | 8/1988 | Batliwalla et al. |
| 4,818,439 | A | 4/1989 | Blackledge et al. |
| 4,930,317 | A | 6/1990 | Klein |
| 4,958,254 | A | 9/1990 | Kidd et al. |
| 4,967,057 | A | 10/1990 | Bayless et al. |
| 4,998,006 | A | 3/1991 | Perlman |
| 5,081,339 | A | 1/1992 | Stine |
| 5,088,487 | A | 2/1992 | Turner |
| 5,148,804 | A | 9/1992 | Hill et al. |
| 5,196,781 | A * | 3/1993 | Jamieson .................. H02J 7/35 136/291 |
| 5,380,988 | A | 1/1995 | Dyer |
| 5,741,318 | A | 4/1998 | Ouellette et al. |
| 5,793,044 | A * | 8/1998 | Mace .................. G01N 21/274 250/339.03 |
| 5,925,275 | A | 7/1999 | Lawson et al. |
| 6,172,344 | B1 * | 1/2001 | Gordon .................... H05B 3/34 219/497 |
| 6,582,383 | B2 | 6/2003 | Horning |
| 6,598,235 | B2 | 7/2003 | Bulla |
| 6,656,210 | B1 | 12/2003 | Plewes |
| 6,903,942 | B2 * | 6/2005 | Flaherty ................ H01H 47/325 363/16 |
| 6,936,018 | B2 | 8/2005 | Chalek |
| 8,011,727 | B1 * | 9/2011 | Martinez .............. B60N 2/2881 297/180.11 |
| 9,044,867 | B2 * | 6/2015 | Rothschild ................ B62B 9/00 |
| 2006/0086717 | A1 * | 4/2006 | Oosterling ............ F24D 13/022 219/528 |
| 2006/0261055 | A1 | 11/2006 | Child et al. |
| 2007/0183476 | A1 * | 8/2007 | Marschner ............. G01K 3/005 374/152 |
| 2008/0230530 | A1 | 9/2008 | Augustine et al. |
| 2008/0245786 | A1 | 10/2008 | Sharma |
| 2010/0241200 | A1 | 9/2010 | Bruder et al. |
| 2014/0131342 | A1 * | 5/2014 | Sun ........................ B32B 37/06 219/213 |
| 2014/0138370 | A1 * | 5/2014 | Royer ...................... H05B 3/84 219/203 |
| 2014/0302735 | A1 | 10/2014 | Donovan et al. |
| 2014/0324232 | A1 * | 10/2014 | Modi ................... F24F 11/0086 700/278 |

\* cited by examiner

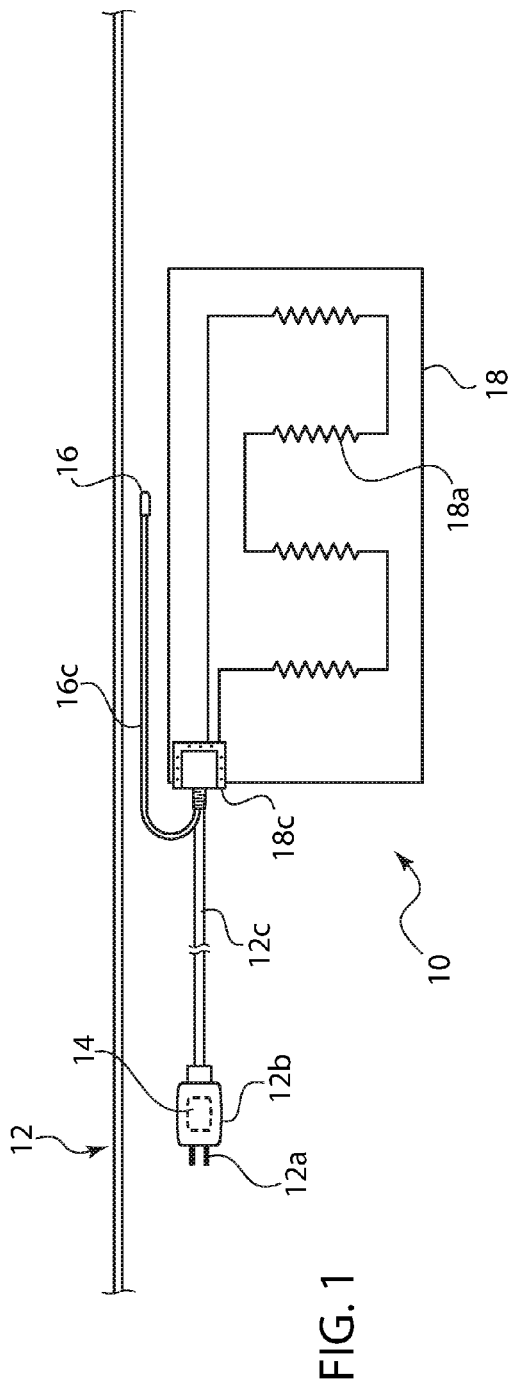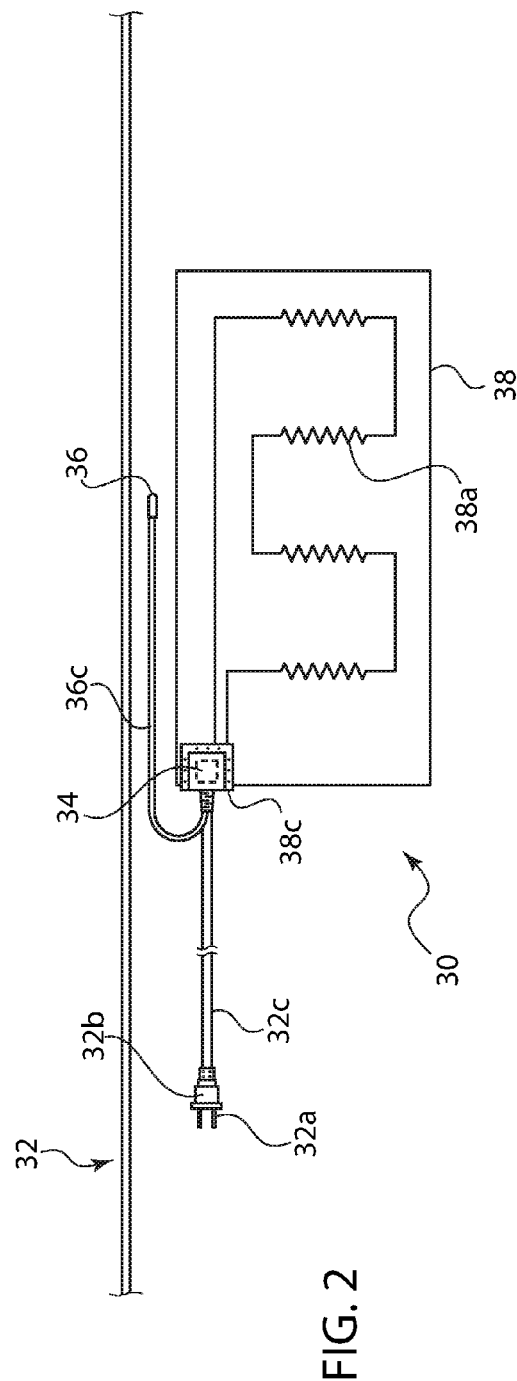

FIG. 6

202 - Stringing a resistance heating wire out on a form

204 - Placing patterned wires and form on to first polyester film

206 - Providing an acylic based polymer liquid adhesive

208 - Coating a second polyester film material with adhesive

210 - Gluing polyester films together to encase wires therebetween

212 - Removing polyester encased wires from the form

214 - Sandwiching the polyester encased wires between two larger PVC sheets

216 - Degassing under vacuum to cure and remove air from adhesive and heating to fuse PVC edges together

ANALOG THERMOSTATIC CONTROL CIRCUIT FOR A HEATING PAD

CROSS-REFERENCE TO RELATED APPLICATIONS

This application is a Divisional of U.S. patent application Ser. No. 14/326,591 entitled HEAT MAT WITH THERMOSTATIC CONTROL filed Jul. 9, 2014, now U.S. Pat. No. 9,370,045, which claims the benefit under 35 U.S.C. §119(e) from U.S. Provisional Patent Application No. 61/938,336 entitled HEAT MAT WITH THERMOSTATIC CONTROL filed Feb. 11, 2014.

BACKGROUND OF THE INVENTION

1. Field of the Invention

The present invention relates to a heat mat with thermostatic control. The heat mat's thermostatic control is used to regulate the temperature of the heat mat and increase the temperature automatically when temperatures fall below a predetermined set point.

2. The Prior Art

Other types of heat mat control are known in the art. For example, heat mat controls may be found in the following: U.S. Pat. No. 2,425,686 to Porter issued on Sep. 22, 1945; and U.S. Pat. No. 2,918,558 issued to Evans on Sep. 19, 1958;

SUMMARY OF THE INVENTION

The invention relates to a thermostatic control for electric heat mats. Heat mats are used in a variety of applications but most heat mats are sold without any type of thermostatic control due to the high cost of electronic thermostats. The thermostatic control for electric heat mats provided by the invention is a low-cost solution that will turn the heat mat on and off at a pre-determined temperatures that are application specific.

The invention comprises an overmolded control circuit, a variable-resistance temperature sensor and a vinyl based heat mat.

The overmolded control circuit contains either a conductive bi-metal thermal switch or low cost electronic printed circuit board as the controlling portion of the design.

In one embodiment, the heat mat includes a thermostatic control circuit coupled between an electrical source and a resistance heating coil. The thermostatic control circuit includes a temperature sensor, a reference voltage generating source, a hysteresis circuit and a power controller for the resistance heating element. The hysteresis circuit compares analog signals from the temperature sensor to internally generated reference parameters derived from the reference voltage generating source to provide a control signal to the power controller that selectively varies the power output to the resistance heating element. The thermostatic control circuit comprises an inexpensive and small form factor integrated circuit board that is connected between a mains electrical source and the resistance heating element.

The temperature sensor is a variable-resistance, low power temperature sensor. The reference voltage generating source includes a bridge rectifier to convert AC from the electrical source to unregulated DC that is supplied to the power controller. The reference voltage generating source further includes a voltage reference diode to create a stable 5v reference regardless of load, changes in power supply or temperature that is supplied to the hysteresis circuit.

The hysteresis circuit includes two thin film resistors and the hysteresis circuit compares analog signals from said temperature sensor to internally generated reference parameters derived from said reference voltage generating source to provide a control signal to said power controller. The power controller includes a MOSFET to selectively control the power to said heating pad. The thermostatic control circuit comprises an inexpensive and small form factor integrated circuit board that is embedded within a plastic overmold housing that is connected between a mains electrical source and said heating pad.

According to a further embodiment, the invention relates to a layered heating pad and method for manufacturing same. The heating pad includes multiple layers comprising in order:
  a. a plastic sleeve layer made from a 24 gauge poly vinyl chloride;
  b. a layer of polyester material;
  c. a middle layer containing high resistance metal alloy wire and polymer liquid adhesive;
  d. an additional layer of polyester material;
  e. an additional plastic sleeve layer made from a 24 gauge poly vinyl chloride.

The metal alloy is copper, nickel or stainless steel. The polyester film is polyethylene terephthalate (PET) and is clear to allow for visual inspection of said resistance heating element. The polymer liquid adhesive delaminates the PET film at temperatures above about 300 degrees F. to operate like a fuse severing the resistance heating wire and halting operation of the heating pad. Other thermostatic controls, for example, analog controls may be used in combination with the overmold and/or method for manufacturing same.

In an alternate embodiment, the heating pad includes multiple layers consisting of in order:
  a. a plastic sleeve layer made from a 24 gauge poly vinyl chloride;
  b. a layer of polyester material;
  c. a middle layer containing high resistance metal alloy wire and polymer liquid adhesive;
  d. an additional layer of polyester material;
  e. an additional plastic sleeve layer made from a 24 gauge poly vinyl chloride.

The polymer adhesive and said polyester films form a fuse, wherein said adhesive delaminates the polyester films at temperatures above about 300° F. causing the resistance heating element to sever causing an open circuit that halts operation of the heating pad. The polymer adhesive comprises a 1.0 mil thick layer of cured adhesive which has a coating weight of about 16 lbs/3,000 ft$^2$, a loop tack of about 4.4 lbs/in; a 180° peel adhesion of about 4.3 lbs/in utilizing a 15 minute dwell, a shear adhesion of 24+ hours utilizing ½ in×½ in×500 grams test conditions, and a plasticity of about 2.4 mm.

The heating pad is claimed in combination with an acrylic polymer dissolved in a solvent which cures to form said polymer adhesive. The solvent is one of toluene, heptane, isopropanol, acetone, ethanol and combinations thereof.

The acrylic polymer is dissolved in the solvent to provide a self-crosslinking polymer liquid adhesive having a viscosity of between 2,000 and 5,000 cps and a density of between 6 and 8 lbs/gal. The heating pad is claimed in combination with a degassing station that degasses the heating pad under vacuum to (i) remove air and solvent from within the mat and cure the liquid adhesive, and (ii) heat and fuse the polyvinyl chloride sheets together around the periphery the mat.

According to a further embodiment of the invention, there is provided a method for manufacturing a heating pad beginning with stringing a resistance heating wire out on a form in a pattern. The patterned wire and form is placed on a first polyester film. A liquid adhesive is provided comprising a single-package, self-crosslinking polymer having a viscosity of between 2,000 and 5,000 cps and a density of between 6 and 8 lbs/gal. The adhesive is coated on to a second polyester film. The first and second polyester films are then glued together to encase the patterned wires therebetween.

The polyester encased wires are then removed from the form to create an intermediate mat. The mat is sandwiched between two larger polyvinyl chloride sheets that extend beyond the mat's periphery to form an ensemble.

The liquid adhesive is cured and degassing under vacuum to reduce entrapped air from within the mat. At the same time the mat is heated to fuse the two layers of polyvinyl chloride together around the periphery of the mat to form the heating pad.

The polyester film is a polyethylene terephthalate (PET) film. The liquid adhesive is an acrylic polymer dissolved in a solvent. The solvent includes toluene, heptane, isopropanol, acetone, ethanol and combinations thereof. A 1.0 mil thick layer of cured adhesive has a coating weight of about 16 lbs/3,000 ft$^2$, a loop tack of about 4.4 lbs/in; a 180° peel adhesion of about 4.3 lbs/in utilizing a 15 minute dwell, a shear adhesion of 24+ hours utilizing ½ in×½ in×500 grams test conditions, and a plasticity of about 2.4 mm. The mat comprises a fuse that delaminates the polyimide electric thin film at high temperatures above after 300° F. causing the resistance heating wire to burn up causing an open circuit that halts operation of the heating pad.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIG. 1 is a schematic view of the first embodiment of the invention with an overmolded electronic PCB thermostatic control in the 120v power adapter.

FIG. 2 is a schematic view of the second embodiment of the invention with an electronic PCB thermostatic control located in the connection sleeve of the electric heat mat.

FIG. 6 is a flowchart showing the steps for manufacturing a heating pad.

DETAILED DESCRIPTION OF THE PREFERRED EMBODIMENTS

Figure 3:
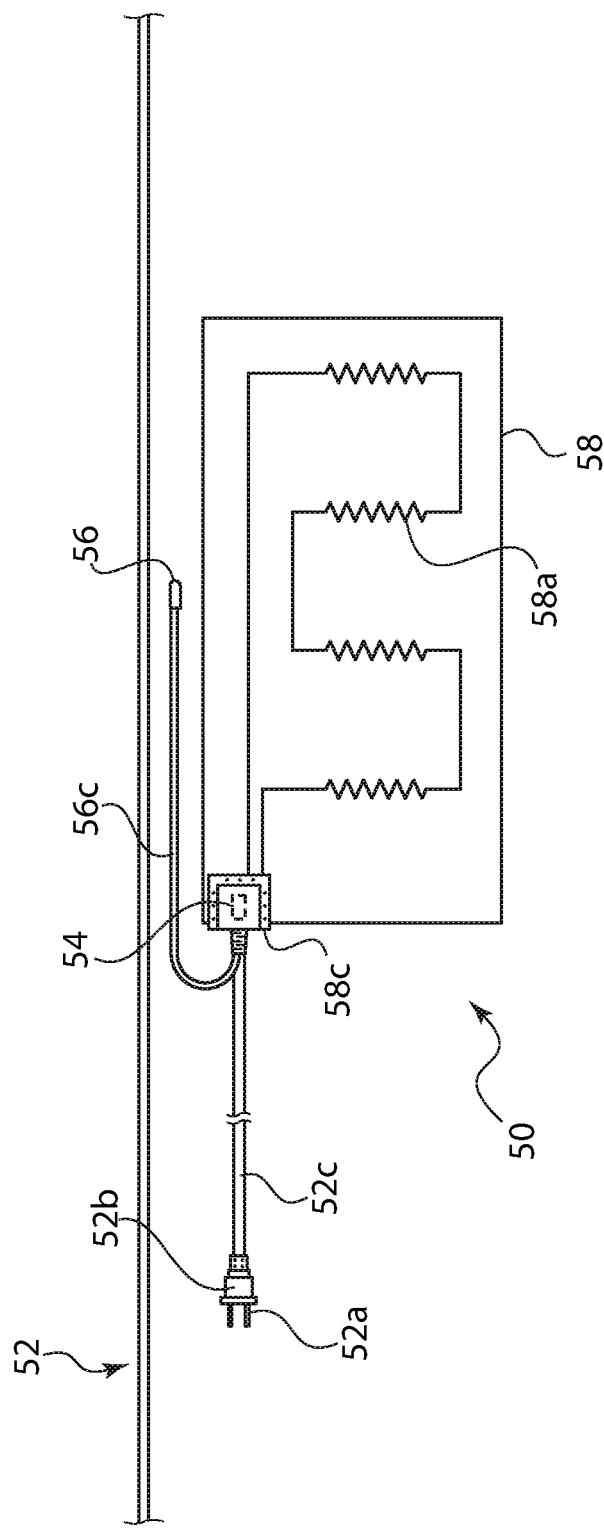
FIG. 3 is a schematic view of the third embodiment of the invention showing a bi-metal thermal switch thermostatic control located in the connection sleeve of the electric heat mat.

The invention relates to a thermostatic control and encapsulating material for a heating pad, and more specifically a waterproof heating pad for indoor and outdoor use. Conventional thermostats have not been widely adopted for use in waterproof heating pads, or heating pads designed for indoor and outdoor use. Such thermostats have been either too expensive or too bulky or both. Accordingly, the primary purpose of the invention is to provide an inexpensive and small form factor thermostat. The thermostat is encapsulated in an overmolded housing which protects it from intrusion from liquids.

The thermostat is provided in printed circuit board (pcb) form, with contacts at the periphery for soldered connections to a power supply, temperature sensor and resistance heating coil. The pcb is inherently a flat thin panel, having dimensions on the order of an inch wide, several inches long and a fraction of an inch thick. Accordingly, this panel geometry is well suited for use in a heating pad that will be used as a mat.

In one embodiment a heating pad assembly 10 is shown in FIG. 1 with a plug 12 and temperature sensor 16 coupled to a heating pad 18. Plug 12 includes prongs 12a for connecting to electrical mains, for example 120V AC. Prongs 12a are supported in a plug housing 12b joined to a plug cable 12c that couples to a connection sleeve 18c on one side of heating pad 18. A temperature sensor 16 joins to a sensor cable 16c that also couples to the connection sleeve 18c. Within connection sleeve 18c, plug cable 12c and sensor cable 16c and resistance heating element 18a are operatively coupled together. A thermostat pcb 14 is located within plug housing 12b. For example, prongs 12a, pcb 14 and the end of plug cable 12c are soldered together and placed within a mold. Plug housing 12b is then overmolded around pcb 14 to seal it and its soldered connections in a waterproof shell.

In a further embodiment a heating pad assembly 30 is shown in FIG. 2 with a plug 32 and temperature sensor 36 coupled to a heating pad 38. Plug 32 includes prongs 32a for connecting to electrical mains, for example 120V AC. Prongs 32a are supported in a plug housing 32b joined to a plug cable 32c that couples to a connection sleeve 38c on one side of heating pad 38. A temperature sensor 36 joins to a sensor cable 36c that also couples to the connection sleeve 38c. Within connection sleeve 38c, plug cable 32c and sensor cable 36c and resistance heating element 38a are operatively coupled together. A thermostat pcb 34 is sealed within an overmold and located within connection sleeve 38c. The connection sleeve 38c is attached on, formed from, or sandwiched between two layers of durable thermoset material forming the outer protective layer of the heating pad. The thermoset material may be polyvinyl chloride (pvc) in 24 gauge thickness or similar material.

The resistance heating element 38a is encased within inner protective layers of polymer sheet material, for example, a thermoplastic material like polyester or more specifically polyethylene terephthalate (PET). The inner protective layers are glued to each other with the resistance heating element contained therein. The glue is a polymer based adhesive having a viscosity of between 2,000 and 5,000 cps and a density of between 6 and 8 lbs/gal.

In practical tests, an adhesive meeting safety and waterproof requirements has properties which a 1.0 mil thick layer of cured adhesive has a coating weight of about 14 to 18 lbs/3,000 ft$^2$, ideally 16 lbs/3,000 ft$^2$, a loop tack of about 4.0 to 5.0 lbs/in, ideally 4.4 lbs/in; a 180° peel adhesion of about 4.0 to 4.6 lbs/in, ideally about 4.3 lbs/in utilizing a 15 minute dwell, a shear adhesion of 24+ hours utilizing ½ in×½ in×500 grams test conditions, and a plasticity of about 2 to 3 mm, ideally 2.4 mm.

Chemically the liquid adhesive is polymer, for example, an acrylic polymer dissolved in a solvent. Suitable solvents include toluene, heptane, isopropanol, acetone, ethanol and combinations thereof. In certain instances the solvent comprises a solvent blend including 2 or more, 3 or more, 4 or more or all of toluene, heptane, isopropanol, acetone, and ethanol. One adhesive meeting the above requirement is Ashland Aroset 390M. Aroset is a single-package, self-crosslinking acrylic polymer that cures at moderate temperatures upon complete solvent removable. Once cured, the polymer is a pressure sensitive adhesive. The vacuum degassing will apply sufficient pressure allow the adhesive to securely bond the two PET films together.

The resistance heating element and crosslinked acrylic polymer and inner PET sleeve operate like a fuse. Upon overheating, the adhesive expands and delaminates the PET film at high temperatures, for example above about 300° F. The as the thin film separates it tears the resistance heating wire. Once the heating wire is severed an open circuit shuts down the operation of the heating pad. More particularly, the MOSFET power controller will shut down if the resistance wire is no longer completing a circuit back to the bridge rectifier.

In yet another embodiment a heating pad assembly 50 is shown in FIG. 3 with a plug 52 and temperature sensor 56 coupled to a heating pad 58. Plug 52 includes prongs 52a for connecting to electrical mains, for example 120V AC. Prongs 52a are supported in a plug housing 52b joined to a plug cable 52c that couples to a connection sleeve 58c on one side of heating pad 58. A temperature sensor 56 joins to a sensor cable 56c that also couples to the connection sleeve 58c. Within connection sleeve 58c, plug cable 52c and sensor cable 56c and resistance heating element 58a are operatively coupled together. A bi-metallic thermostat 54, for example a bi-metal thermal switch, is overmolded and located within connection sleeve 38c.

To create the overmold, the pcb is suspended centrally a molding cavity. A molten thermoplastic material resin is injected into the cavity to encapsulate the pcb. This process is effective in protecting the internal electrical components and may be utilized in combination with a bi-metallic thermostat.

The thermostat is an electronic circuit that monitors the temperature, establishes a temperature threshold and controls the power output to the resistance coil. A temperature sensor is provided, for example, a low power temperature sensor. In one embodiment the temperature sensor is disposed at the end of sensor cable, so it can be placed in varying distance to the heating elements. The thermostatic control circuit utilizes a voltage reference and hysteresis circuit to set a temperature threshold for the resistance heating coil. The control circuit then varies the power provided to the resistance heating coil to achieve the desired temperature at the sensor.

Figure 4:
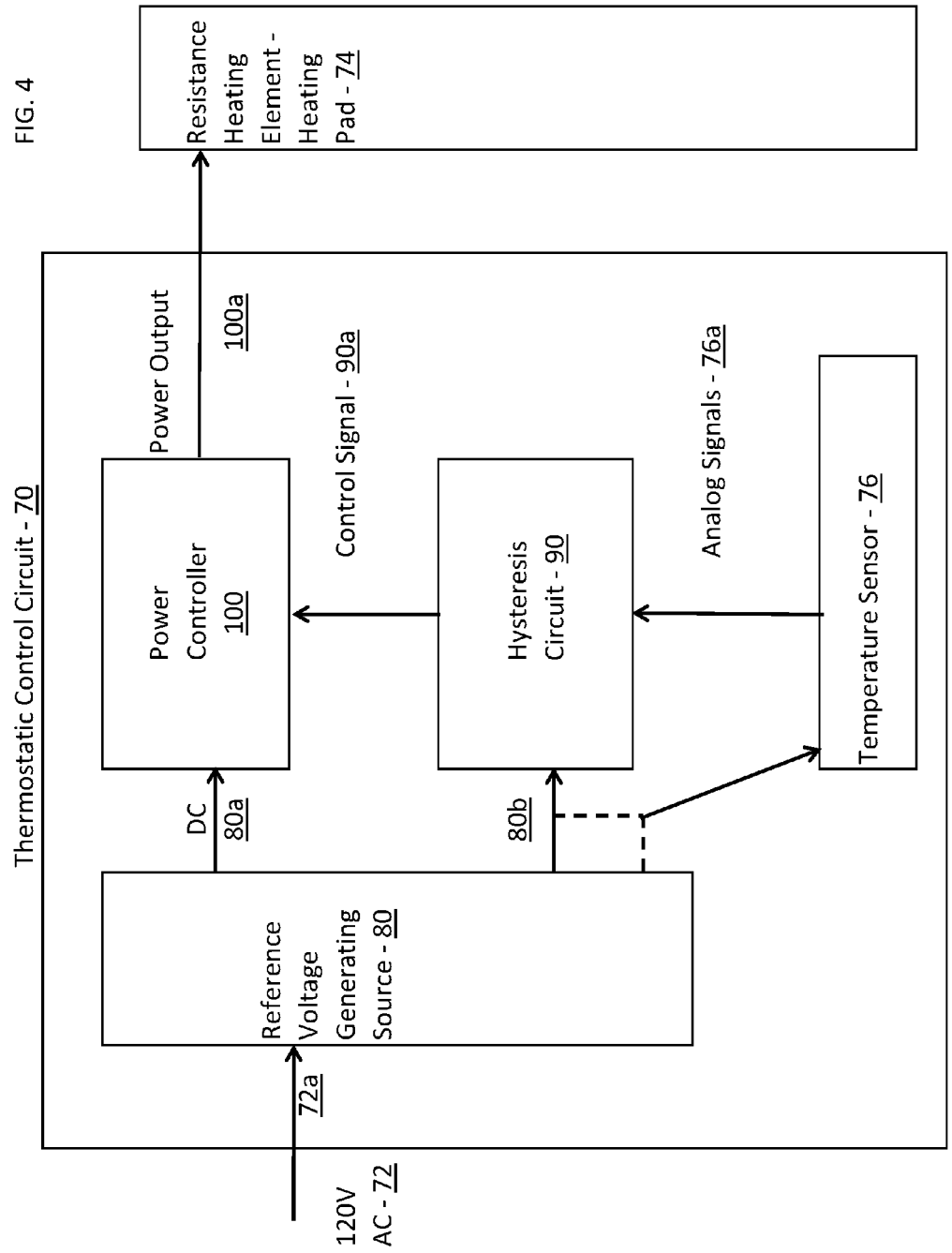
FIG. 4 is a schematic view of the thermostatic control circuit.

The thermostatic control circuit 70 is formed on a printed circuit board (pcb), an electrical schematic of which is shown in FIG. 4. On the input side, an electrical mains 72 is coupled to the control circuit, and on the output side, the control circuit is coupled to the resistance heating element 74. A further input is received from a variable-resistance, low power temperature sensor 76.

More specifically, electrical mains 72 provides a 120V AC input 72a to reference voltage generating source 80. Reference voltage generating source 80 provides a high voltage DC output 80a to power controller 100. Reference voltage generating source 80 also provides low voltage DC output 80b to hysteresis circuit 90. More particularly, low voltage DC output 80b is a 5V DC reference voltage that remains stable regardless of load, changes in power supply or temperature. Reference voltage generating source 80 also provides low voltage DC output 80b to temperature sensor 76. The low voltage DC output to temperature sensor 76 may be the same output or a different output than provided to hysteresis circuit 90, as illustrated by the two dotted lines. Temperature sensor 76 is a variable-resistance, low voltage temperature sensor that generates an analog signal 76a that is provided to hysteresis circuit 90.

In using thermostatic control circuit pcb 14,70 in the Embodiment of FIG. 1, the pcb is disposed within plug housing 12b. Prongs 12a provide AC input 72a. Prongs 12a, pcb 14, 70 and the end of plug cable 12c are place into a mold, and plug housing 12b is overmolded to seal and secure the components together. Low voltage DC output 80b is supplied along plug cable 12c, through connection sleeve 18c, then along sensor cable 16c to power sensor 16. Analog signals 76a from sensor 76 are supplied along sensor cable 16c, through connection sleeve 18c, then along plug cable 12c to hysteresis circuit 90 within pcb 14, 70. Power output 100a is supplied along plug cable 12c, through connection sleeve 18c to resistance heating element 18a, 74. The connection sleeve is formed by placing the ends of plug cable 12c and sensor cable 16c in a mold and overmolding the connection sleeve as a flat pack. The strain relief shown off the left side of connection sleeve 18c may be formed integrally with the overmold.

In using thermostatic control circuit pcb 34, 70 in the Embodiment of FIG. 2, the pcb is connected to plug cable 32c and sensor cable 36c. This pcb is then placed in a mold and the connection sleeve is overmolded as a flat pack. The strain relief shown off the left side of connection sleeve 38c may be formed integrally with the overmold. AC input 72a is provided along plug cable 32c. A low voltage DC output 80b and analog signals 76a are provided along sensor cable 36c. The overmolded connection sleeve is secured to heating pad 38 and power output 100a is connected to resistance heating element 38a.

In a further embodiment shown in FIG. 3, a bi-metal thermostat 54 is connected to plug cable 52c and sensor cable 56c. The bi-metal thermostat 54 is then placed in a mold and the connection sleeve is overmolded as a flat pack. The strain relief shown off the left side of connection sleeve 58c may be formed integrally with the overmold. AC input is provided along plug cable 52c.

Figure 5:
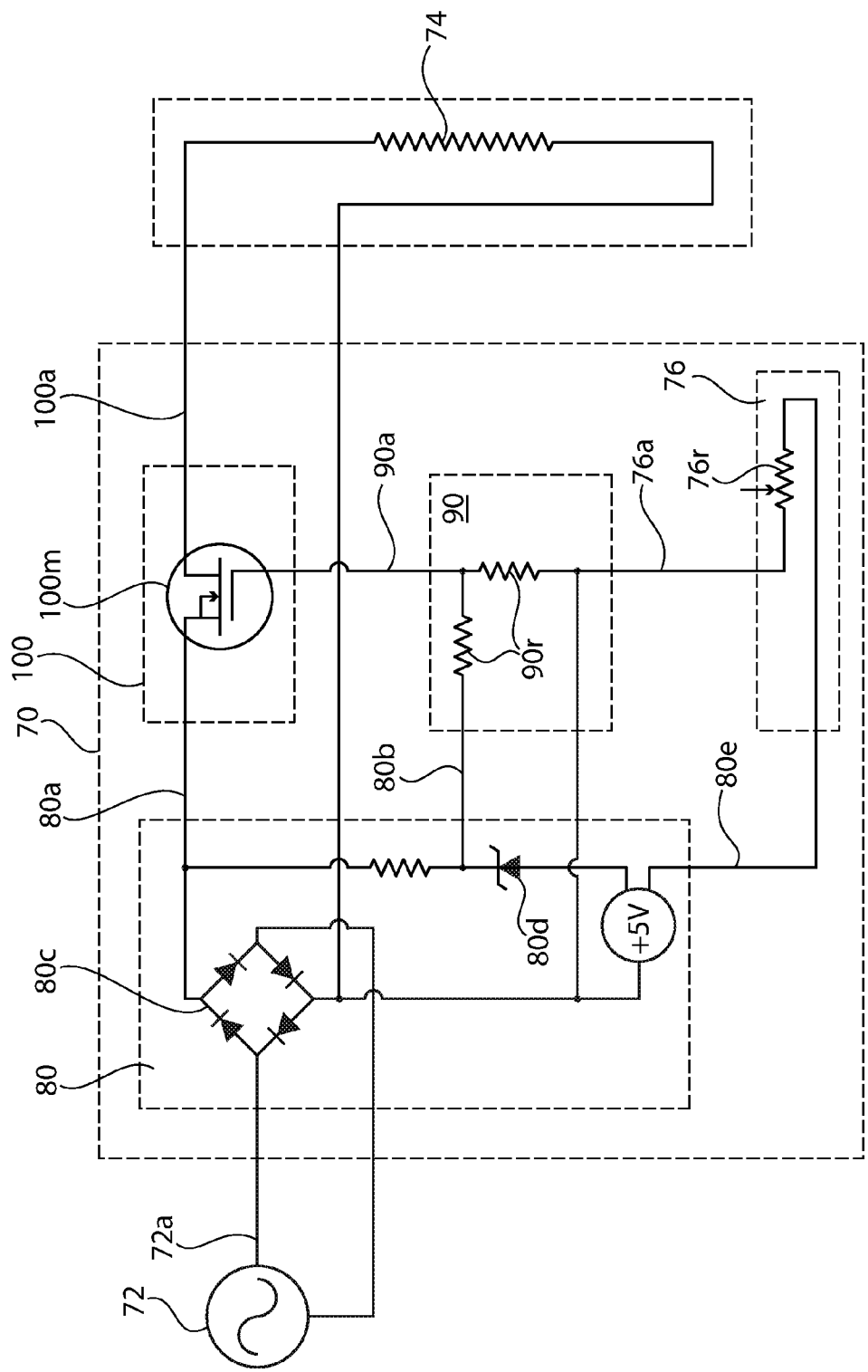
FIG. 5 is a circuit diagram of the thermostatic control circuit.

Thermostatic control circuit 70 is configured as a temperature threshold setting device. In one embodiment shown in FIG. 5 the reference voltage generating source 80 includes a bridge rectifier 80c and a voltage reference diode 80d. The bridge rectifier converts the inputted AC to unregulated high voltage DC output 80a. Voltage reference diode 80d creates a stable voltage reference regardless of load, or changes in power supply or temperature. The voltage reference is 5v, for example, output via low voltage DC output 80b.

Hysteresis circuit 90 includes two thin film resistors 90r. Sensor 76 includes a variable resistor 76v that is supplied with low voltage DC output 80e. The variable resistor uses electrical impulses to measure the temperature of the heat pad using parameters created with the hysteresis circuit to set the temperature threshold for the resistance heat coil. By adjusting the variable resistor, different temperature thresholds can be set. The hysteresis circuit 90 utilizes the low voltage DC output 80b and sensor output 76a to supply a control signal 90 to power controller 100.

Once the temperature threshold is acquired, a MOSFET 100m within power controller is utilized to selectively control the power that is outputted to the resistance heating coil. The thermostatic control comprises an inexpensive and small form factor integrated circuit board that is embedded within a plastic overmold housing that is connected between a mains electrical source and said heating pad. For high heat or commercial applications larger MOSFET power controllers may be utilized. The pcb containing such MOSFETs may require passive cooling. One type of cooling device includes a heat sink made from metal or other material. For example, the pcb or MOSFET may be conductively coupled to an aluminum plate. The plate may be structured as a sub-layer formed beneath the pcb where it is electrically insulated and thermally coupled to same.

The thermostatic control encased within an overmold flat pack and the resistance heating coil are sealed within multiple layers comprising in order
  a. a plastic sleeve layer made from a 24 gauge poly vinyl chloride
  b. a layer of thermoplastic material comprising PET
  c. a layer of polymer liquid adhesive
  d. a layer containing high resistance metal alloy wire
  e. an additional layer of thermoplastic material comprising PET
  f. an additional plastic sleeve layer made from a 24 gauge poly vinyl chloride.

A method of manufacturing a heating pad, according to a further embodiment of the invention, will now be described with respect to FIG. 6. In summary, a polymer adhesive having specific chemical and rheological properties is used to encase a resistance heating wire between two thermoplastic polyester sheets to produce a mat. The mat is then sandwiched between two layers of PVC. In the event a section of the resistance heating wire overheats, the adhesive expands causing the polyester sheets to delaminate thereby severing the wire. The severed wire creates an open circuit that halts operation of the heating pad.

The manufacturing method begins with stringing 202 a resistance heating wire out on a form. The form may be configured as a board with short pegs laid out in a pattern. The wire is wrapped around the pegs taking the shape of the pattern, for example, a sinusoidal wave pattern, to route the wire for even heating across the entire surface of the heating pad. The pegs may be withdrawn down into the board when the wire is ready to be removed from the form. The form and wrapped wires are placed on top a first polyester or PET film 204.

A liquid adhesive is provided 206 comprising a single-package, self-crosslinking acrylic based polymer having a viscosity of between 2,000 and 5,000 cps and a density of between 6 and 8 lbs/gal. Additional adhesive properties include one or more of: a 1.0 mil thick layer of cured adhesive has a coating weight of about 16 lbs/3,000 ft2, a loop tack of about 4.4 lbs/in; a 180° peel adhesion of about 4.3 lbs/in utilizing a 15 minute dwell, a shear adhesion of 24+ hours utilizing ½ in×½ in×500 grams test conditions, and a plasticity of about 2.4 mm. The adhesive is dissolved in a solvent selected from the group consisting of toluene, heptane, isopropanol, acetone, ethanol and combinations thereof.

In practical applications, Aroset 390M self-crosslinking pressure sensitive adhesive available from Ashland has been used. Aroset 390M is a single-package, self-crosslinking acrylic polymer that cures at moderate temperatures upon complete solvent removal. At room temperature, full cure may take up to one week. In use, Aroset 390M functions as a pressure sensitive adhesive. The adhesive is dissolved in a solvent blend including toluene, heptane, isopropanol, acetone, and ethanol.

A layer of adhesive is coated 208 on to a second polyester or PET film that is placed on top of the patterned wire. The two PET film layers are glued 210 together encasing the wire therebetween. Now that the wire is held in place by the adhesive and PET film layers, the wire can be removed 212 from the form. For example, the pegs are withdrawn, allowing the resistance wire to come free of the form and remain adhered to the adhesive and two polyester sheets in the formed or patterned shape to form an intermediate mat.

The thermoplastic films that may be used to form intermediate mat may be between 1.8 and 2.2 mils thick with a density between 1.2 and 1.6 $g/cm^3$, ideally 2 mils thick and 1.4 $g/cm^3$. Such films would further have a tensile in the range of 17 to 25 psi, ideally 21 psi. The films would have a strength between 20 and 30 $Kg/mm^2$, ideally 24 $Kg/mm^2$. The film elongation would be 160 to 240%, ideally 200%. The film would possess an At Break value between 100 and 140, ideally 120. The friction value would be between 0.3 and 0.6 μk, ideally 0.4 μk. The coefficient value would be between 0.3 and 0.7 μs, ideally 0.5 μs. The surface roughness would be 0.013 Ra, 0.12 Rz and 0.25 Rmax. The optical haze would be about 1.4%, the light transmission about 93% and the gloss about 200%. The thermal heat value would be in the range of 1.2 to 1.6% MD measured by the SKC method, ideally 1.4%. The thermal shrinkage value would be in the range of 0.3 to 0.7 TD measured at 150 degrees C.×30 mins, ideally 0.5 TD.

Next, the mat is sandwiched 214 between two layers of larger polyvinyl chloride sheets to form the heating pad. Since the PVC sheets are larger than the mat they can be fused together. The heating pad are then placed within a clamshell, subject to vacuum and heated to cure the adhesive and fuse the edges of the PVC to each other. In other words the assembled pad is degassing under vacuum to reduce entrapped air and evaporated adhesive solvent from within the mat. Degassing includes subjecting the sealed clamshell to −20 to −35 inches Hg vacuum, ideally between −26 to −30 inches Hg vacuum. Heating includes placing the clamshell within an oven for 0.5 to 2.0 hours at 300 to 400 degrees F., ideally about 1.3 hours at 350 degrees F.

The thermostatic control circuit described above and in FIGS. 4 and 5 is also sandwiched between two layers of PVC to form a flat pack. The flat pack is coupled to the leads of the resistance heating wire. In the embodiment of FIG. 2, the flat pack is placed adjacent to the mat to form the connection sleeve 38c. The flat pack and mat are then collectively sandwiched on or between two layers of PVC, which forms the sealed exterior of the heating pad.

The mat comprises a fuse. In use, an overheat condition causes the adhesive to expand and delaminate the PET film at high temperatures above about 300° F. causing the resistance heating wire to severe causing an open circuit that halts operation of the heating pad.

Having described preferred embodiments for (which are intended to be illustrative and not limiting), it is noted that modifications and variations can be made by persons skilled in the art in light of the above teachings. The power source designated as 120V AC could be 220 or higher for commercial applications. The mat could be manufactured from equivalent materials or other processing steps known within the industry. The circuit blocks or components could include equivalent devices. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A heating pad comprising:
a resistance heating element; and
a thermostatic control circuit coupled between a mains electrical source and said resistance heating coil, wherein said thermostatic control circuit comprises a variable-resistance, low power temperature sensor, a reference voltage generating source, a hysteresis circuit having a first and second thin film resistor and a power controller for said resistance heating element;
wherein said hysteresis circuit compares an analog signal from said temperature sensor across said first thin film resistor to an analog signal derived from said reference voltage generating source across said first thin film resistor to provide a control signal to said power controller that selectively varies the power output to said resistance heating element,
wherein said thermostatic control circuit comprises a small form factor integrated circuit board that is embedded within a plastic housing that is connected between a mains electrical source and said resistance heating element.

2. The heating pad of claim 1, wherein said reference voltage generating source includes a bridge rectifier to convert AC from the mains electrical source to unregulated DC that is supplied to said power controller.

3. The heating pad of claim 2, wherein said reference voltage generating source includes a voltage reference diode to create a stable 5v reference voltage regardless of load, changes in power supply or temperature that is supplied to said hysteresis circuit.

4. The heating pad of claim 1, wherein said power controller comprises a MOSFET.

5. The heating pad of claim 1, wherein said integrated circuit board containing said thermostatic control circuit is disposed within an overmolded power plug.

6. The heating pad of claim 1, wherein said resistance heating element made of a high resistance metal alloy wire is sealed between two layers of material made of polyethylene terephthalate (PET) film forming a sandwich.

7. The heating pad of claim 6, wherein said sandwich is sealed between two layers of polyvinyl chloride (PVC).

* * * * *